United States Patent
Buhlmann

(10) Patent No.: US 9,174,423 B2
(45) Date of Patent: Nov. 3, 2015

(54) METHOD FOR PRODUCING A DECORATIVE LAMINATE

(75) Inventor: Carsten Buhlmann, Rangsdorf (DE)

(73) Assignee: Surface Technologies GMBH & Co. KG (DE)

( * ) Notice: Subject to any disclaimer, the term of this patent is extended or adjusted under 35 U.S.C. 154(b) by 421 days.

(21) Appl. No.: 12/809,494

(22) PCT Filed: Dec. 19, 2008

(86) PCT No.: PCT/EP2008/068070
§ 371 (c)(1),
(2), (4) Date: Aug. 23, 2010

(87) PCT Pub. No.: WO2009/080772
PCT Pub. Date: Jul. 2, 2009

(65) Prior Publication Data
US 2010/0307677 A1  Dec. 9, 2010

(30) Foreign Application Priority Data
Dec. 21, 2007 (DE) .......................... 10 2007 062 600

(51) Int. Cl.
| | |
|---|---|
| *B32B 37/02* | (2006.01) |
| *B32B 37/10* | (2006.01) |
| *B32B 37/14* | (2006.01) |
| *B32B 37/15* | (2006.01) |
| *B32B 38/00* | (2006.01) |
| *B32B 21/02* | (2006.01) |
| *B32B 21/06* | (2006.01) |
| *B44C 1/10* | (2006.01) |
| *B44C 5/04* | (2006.01) |
| *B32B 7/12* | (2006.01) |
| *B32B 27/26* | (2006.01) |
| *B32B 27/10* | (2006.01) |
| *B32B 37/12* | (2006.01) |
| *B32B 38/06* | (2006.01) |

(52) U.S. Cl.
CPC ................. *B32B 38/145* (2013.01); *B32B 7/12* (2013.01); *B32B 21/02* (2013.01); *B32B 21/06* (2013.01); *B32B 37/02* (2013.01); *B32B 37/14* (2013.01); *B44C 1/10* (2013.01); *B44C 5/043* (2013.01); *B32B 37/12* (2013.01); *B32B 38/06* (2013.01); *B32B 2038/0076* (2013.01); *B32B 2255/08* (2013.01); *B32B 2255/12* (2013.01); *B32B 2255/20* (2013.01); *B32B 2255/26* (2013.01); *B32B 2307/75* (2013.01); *B32B 2317/12* (2013.01); *B32B 2317/16* (2013.01); *B32B 2451/00* (2013.01); *B32B 2471/00* (2013.01); *B32B 2479/00* (2013.01); *B32B 2607/00* (2013.01); *B32B 2607/02* (2013.01)

(58) Field of Classification Search
CPC  B32B 2038/0076; B32B 21/02; B32B 21/06; B32B 2317/12; B32B 2317/16; B32B 2607/00; B32B 37/12; B32B 38/06; B32B 38/145; B32B 2255/08; B32B 2255/12; B32B 2255/20; B32B 2255/26; B32B 2307/75; B32B 2451/00; B32B 2471/00; B32B 37/02; B32B 2037/1253; B32B 37/14; B44C 1/10; B44C 5/043; B44C 5/0476; Y10T 428/24355; Y10T 428/24364; Y10T 428/24372; Y10T 428/24405; Y10T 428/24413; Y10T 428/24421; Y10T 428/2443; Y10T 428/24438; Y10T 428/24612; Y10T 428/25; Y10T 428/254; Y10T 428/257; Y10T 428/259; Y10T 428/31768
USPC .............. 156/235, 239, 240, 241, 277, 308.6, 156/300, 307.1
See application file for complete search history.

(56) References Cited

U.S. PATENT DOCUMENTS

| | | | | |
|---|---|---|---|---|
| 2,428,979 | A * | 10/1947 | May .............................. | 156/197 |
| 3,962,009 | A * | 6/1976 | Minami et al. .................. | 156/85 |
| 4,154,882 | A * | 5/1979 | Ungar et al. ................... | 428/165 |
| 4,196,033 | A * | 4/1980 | Arai et al. ...................... | 156/196 |
| 4,517,235 | A * | 5/1985 | Ungar et al. ................... | 428/148 |
| 4,520,062 | A * | 5/1985 | Ungar et al. ................... | 428/148 |
| 5,545,476 | A |  8/1996 | O'Dell et al. | |
| 2003/0113520 | A1* | 6/2003 | Takahashi et al. ............. | 428/201 |
| 2003/0134108 | A1* | 7/2003 | Lakatosh et al. .............. | 428/343 |
| 2003/0221776 | A1* | 12/2003 | Lakatosh et al. ........... | 156/307.1 |
| 2004/0026017 | A1* | 2/2004 | Taylor et al. .................. | 156/230 |
| 2005/0136254 | A1* | 6/2005 | Brown ........................... | 428/375 |
| 2006/0003217 | A1* | 1/2006 | Cohen et al. .................... | 429/34 |
| 2006/0032175 | A1* | 2/2006 | Chen et al. ...................... | 52/578 |
| 2007/0193174 | A1* | 8/2007 | Vogel et al. .................. | 52/483.1 |
| 2008/0070005 | A1* | 3/2008 | Kobayashi et al. ........... | 428/161 |
| 2011/0052880 | A1* | 3/2011 | Iizuka et al. ................... | 428/172 |

FOREIGN PATENT DOCUMENTS

| | | |
|---|---|---|
| DE | 19532819 | 3/1997 |
| DE | 102006007038 A1 | 9/2006 |

(Continued)

OTHER PUBLICATIONS

English translation of WO03095202 by Eisermann. Nov. 20, 2003.*

(Continued)

*Primary Examiner* — Sonya Mazumdar
(74) *Attorney, Agent, or Firm* — Senniger Powers LLP

(57) ABSTRACT

A method for producing a decorated laminate having a plate-shaped core made of wood or wood material, a decorative layer on at least one side of the core, and a cover layer having aminoplast on the decorative layer, comprising the following steps: providing the plate-shaped core, fastening a cellulose nonwoven material on at least one side of the core, printing the decoration on the exposed side of the cellulose nonwoven material, attaching at least one curable cover layer on the printed decoration, and curing the curable layers.

25 Claims, No Drawings

(56) References Cited

FOREIGN PATENT DOCUMENTS

| EP | 1749676 | 2/2007 |
|---|---|---|
| EP | 1820640 | 8/2007 |
| JP | S52-033163 B | 8/1977 |
| JP | S52-141783 A | 11/1977 |
| JP | 02155730 A * | 6/1990 |
| JP | H02-155730 A | 6/1990 |
| JP | H05-004305 A | 1/1993 |
| JP | H08-169079 A | 7/1996 |
| JP | H08-238737 A | 9/1996 |
| JP | H11-245337 A | 9/1999 |
| JP | 2003-001781 A | 1/2003 |
| RU | 2213668 C2 | 10/2003 |
| WO | 03/095202 | 11/2003 |
| WO | 2005/051661 | 6/2005 |
| WO | 2005051661 | 6/2005 |
| WO | 2006/002917 | 1/2006 |

OTHER PUBLICATIONS

English translation of EP1749676 by Bauer, Jun. 9, 2005.*
English translation of DE19532819 Hofa, Mar. 13, 1997.*
English translation of EP1820640 by Vogel et al. Aug. 22, 2007.*
English translation of WO2006/002917 by Hagspiel. Jan. 12, 2006.*
English translation of JP02-155730; Jun. 1990.*
English translation of JP05-004305; Jan. 1993.*
English translation of JP08-169079; Jul. 1996.*
English translation of JP08-238737; Sep. 1996.*
English translation of JP11-245337, Aug. 1977.*
English translation of JP2003-001781, Jan. 2003.*
English translation of JP52-141783, Nov. 1977.*
English translation of abstract of RU2213668; Oct. 10, 2003.*
English translation of abstract of DE102006007038; Sep. 14, 2006.*

* cited by examiner

METHOD FOR PRODUCING A DECORATIVE LAMINATE

This is a National phase of PCT/EP2008/068070 filed Dec. 19, 2008, which claims the priority of DE 10 2007 062 600.4 filed Dec. 21, 2007, all applications are incorporated by reference herein.

The invention concerns a process for producing a decorative laminate, in particular a laminate having a carrier based on wood materials with a decoration and at least one cover or protective layer arranged thereover.

Such laminates are frequency employed for example for floors, wall and ceiling claddings, working panels and furniture. In that case the decoration can imitate another material, for example wood, ceramic, natural or artificial stone or can take account of artistic or practical aspects. Usually the decoration is protected from wear by a more or less transparent thermoplastic layer. It is also usual for the surface of that cover layer to be provided with a structure which is in spatial relationship with the decoration and which is referred to as Synchronpore.

Technical development hitherto has led essentially to two different groups of materials for the cover layers. So-called lacquer layers are formed from compositions which contain components which by heat and/or radiation can be polymerised and/or crosslinked and thereby hardened, such as for example acrylates, epoxies, maleimides.

The second group of material used for the cover layers includes the so-called aminoplasts. That term is used to denote polycondensation products of carbonyl compounds, in particular formaldehyde, and compounds containing amino groups such as for example urea, melamine and urethane. Production of the layers in the laminate is usually implemented by employing aqueous solutions of condensation products of a carbonyl compound and amine with an excess of the carbonyl compound which crosslink upon drying and heating to give a thermosetting structure. As in that case both the water present as the solvent and also the water which occurs in the condensation reaction escapes in the form of vapour hardening must be effected at least substantially in a press so that the product acquires the desired strength and surface quality.

The decoration is conventionally implemented in the form of a printed paper or paper otherwise provided with a pattern, or other cellulose nonwoven material impregnated with hardenable lacquer or synthetic resin and arranged between the carrier and a wear-resistant outer cover layer. Usually production of the impregnated decorative paper requires separate working operations in respect of printing and impregnation which generally are performed in operations outside the actual laminate production process and represent a considerable cost factor. It is also necessary for the impregnation material for the decorative paper to be compatible with the lacquer or synthetic resin of the decorative layer, which cannot be presupposed in particular when the lacquer and the synthetic resin come together.

A further problem of this technology is that upon impregnation of the decorative paper, it experiences a change in size which has to be taken into consideration in the further course of the process if the spatial relationship between the decoration and the surface structure (Synchronpore) is to be retained. That turns out to be difficult in particular when the product is frequently changed.

WO 03/095202 A1, to solve that problem, proposes applying a resin-bearing intermediate layer to the carrier before application of the decorative paper, and using a decorative paper which contains only little or no impregnation resin at all. That solution however also does not appear to be optimal because the application of the intermediate layer signifies an additional working step and the decorative paper also has to be printed upon prior to the laminate production operation.

There have therefore long been endeavours to produce the decoration directly on the carrier in the laminate production process by so-called direct printing. Then no further process steps which change the dimensions need to take place between production of the decoration and production of the surface structure. DE 19532819 A1 discloses a process for the production of a wood material panel having an optically configuratable surface, wherein the carrier panel is successively provided with a base colouration, a sealing means, a print base and a decorative print. In that respect a surface lacquer is used as the print base. In that structure therefore no paper is now contained in the decorative layer.

WO 2006/002917 A2 describes a process for producing a panel having a surface which has a decoration, in which the surface to be provided with the decoration is primed, smoothed with a plurality of filler layers and a roller treatment and printed upon to produce the decoration. The primer layer can be applied in the form of a synthetic resin layer and the printed surface can be provided with a sealing means which can comprise synthetic resin.

Parkettmagazin May 2007, pages 49 to 51, describes the structure of such a directly printed panel which under the printed colour layer has at least one primer and a plurality of rolled base layers.

What is common to the known processes operating with direct printing is that a relatively large number of working operations is necessary for preparation of the surface to be printed upon.

The problem of the present invention is that of providing a process with which the decoration can be more easily and less expensively applied to decorated laminates.

That problem is solved by a process as set forth in the main claim.

More specifically it was surprisingly found that it is possible to apply to a cellulose nonwoven material fixed on at least one side of the core of wood or wood material, a decoration which is of outstanding quality and to which the usual hardenable cover layers can be applied without difficulty and hardened. The nonwoven material can therefore replace the priming and smoothing layers without the print suffering from quality impairments.

The carrier or core of the laminate substantially comprises a preferably plate-shaped wood or wood material. Fibre panels, in particular HDF and MDF panels are preferred.

Preferably the cellulose nonwoven material is glued on the core. For that purpose advantageously either one side of the core and/or a side of the cellulose nonwoven material is coated with adhesive.

The adhesive is preferably a fluid hardening glue, particularly preferably a urea formaldehyde glue.

The term cellulose nonwoven material is used here to denote all flat structures essentially comprising cellulose fibres, including paper. The various qualities of the nonwoven materials differ for example in terms of thickness, fibre strength and porosity. Depending on the respective desired detail resolution of the print image, an upper limit in terms of pore size must be observed. On the other hand porosity promotes the absorption of the printing ink and anchoring with the adhesive.

The cellulose nonwoven material is preferably a paper, in particular a so-called printing base paper. That is used to denote for example the paper qualities usually employed for printing the decorative paper. The printing base paper can already have a light basic shade of the decoration, but it can also be white or be of another colour. Papers of a weight in relation to surface area of from 20 to 200 g/m² are preferred, particularly preferably from 40 to 80 g/m².

When a liquid glue is used, it is then desirable for the nonwoven material to be joined to the core by at least partial hardening of the glue under the effect of pressure and heat. An advantage of the process using liquid glue however is also that upon hardening the liquid glue can compensate for irregularities in the surface of the core, whereby contact between the printing mould and the printing material is improved and the quality of the print increased. That applies in particular when the printing is performed by means of a smoothing roller on the nonwoven material.

It may be necessary to match the flow and wetting properties and the application weight of the glue to the properties of the cellulose nonwoven material used in order to avoid glue passing through the nonwoven material to the exposed surface. Such glue penetration can be troublesome in regard to the subsequent printing operation, particularly if it occurs in locally irregular manner, and possibly also interferes with the visual impression of the finished laminate. The man skilled in the art however is capable of avoiding that problem by a variation in the above-mentioned parameters.

Basically all known printing processes are suitable for producing the decoration. Preferred processes however are those which have a certain tolerance in relation to irregularities in the printing material such as offset printing, indirect intaglio printing (transfer from the engraved roller to the printing material by means of a rubber blanket), flexoprinting and digital printing processes such as for example ink jet or transfer printing.

The decoration can be printed in one colour with a printing mechanism, in which case advantageously a second colour can implemented by the shade of the printing base paper. It is equally possible for a plurality of colours to be successively printed with a plurality of printing mechanisms.

When carrying that process into effect it was found that the surface of the nonwoven material fixed on the core remains sufficiently absorbent if penetration of the glue therethrough is avoided. The consequence of this is that the printing ink is readily absorbed by the nonwoven material and there is no risk of smearing in further working steps such as for example further printing stages or the application of the cover layer. Relatively short drying times after the individual printing operations are therefore sufficient.

Basically the known synthetic resins and lacquers are suitable as the material for the at least one hardenable cover layer. Thus it is possible to also apply radiation-crosslinkable lacquers as the cover layer. However cover layers of aminoplasts, in particular melamine formaldehyde resins, are preferred.

It is advantageous for a particulate hard solid material, preferably aluminium oxide, silicon dioxide, silicon carbide or boron nitride to be incorporated into the at least one cover layer. The solid material is of a suitable mean particle size for example of 30 to 200 µm.

In another advantageous embodiment according to the invention the cover layer is applied in the form of a so-called overlay. This involves a fibre material layer, for example a paper, which is impregnated with the hardenable aminoplast intended for the cover layer, for example melamine formaldehyde resin. The hard solid material can also be incorporated into that overlay.

It is particularly advantageous for the cover layer of aminoplast to be applied in the form of a plurality of sublayers and for each sublayer to be dried prior to application of the next. In that way the mechanical properties of the hardened cover layer are improved. Optionally the particulate hard solid material is preferably incorporated into the lower one of the sublayers and not into the outermost sublayer. That provides that the solid material particles do not protrude from the surface of the finished laminate, which can both be detrimental for the appearance and touch and also in terms of use and damage to the tools for further processing, for example the press surfaces.

After application of the cover layer the laminate is heated under pressure. A short-cycle or double-belt press is preferably used for that purpose. The pressures and temperatures to be applied depend on the nature of the resin and the structure of the laminate layers. Suitable ranges are between 20 and 60 kN/cm² and 160 to 220° C. respectively. In the pressing operation, the definitive structure of the laminate surface is established by the shape of the pressing surface. The surface structure can be flexibly altered upon a change in product if preferably an interchangeable pressing sheet or a pressing belt or a pressing film is inserted between the press jaws and the laminate surface. Thus it is also possible to provide a pore structure (Synchronpore) which is positive (sunk) or negative (raised) in spatial relationship with the decoration, or a high-sheen or controlledly matted surface. The process according to the invention in that case affords the particular advantage that irregularities in the layers are compensated without a further intermediate treatment or subsequent treatment such as the application of grinding and smoothing lacquer layers or treatment with a smoothing roller, in the pressing operation. The Synchronpore can be embodied in a simple manner if a digitally controlled process is used for production of the pressing plate, pressing belt or pressing film, and the same data set is used for the digital printing operation as for the pressing plate, pressing belt or pressing film, possibly after conversion, because the print image no longer shrinks after the printing operation.

Advantageously on the non-decorated side of the core the laminate is provided with a stabilising layer to prevent deformation under changing climatic conditions. In the simplest way that is achieved if the stabilising layer corresponds in its layer structure to the structure of the decoration side. When using the process according to the invention that stabilising layer can be respectively applied simultaneously with the corresponding layers of the decoration side, that is to say possibly gluing on a stabilising layer paper and applying the layer or layers corresponding to the decorative layer.

The process according to the invention provides that in the production of the laminates preparation of the cores for the direct printing operation is substantially more economical than the state of the art because only one layer of cellulose nonwoven material, in particular paper, is applied, and the multiple coating and smoothing operations necessary with the known processes are avoided.

EMBODIMENT

MDF panels measuring about 2×3 m are cleaned, smoothed and heat-treated. By means of a roller coating installation an acid hardener for urea formaldehyde glue (hardener 2547-Akzo Nobel) is applied with an application weight of about 8 g per square meter at ambient temperature and slightly dried with an IR radiating device. Thereupon a glue layer of about 40 g per square meter (urea formaldehyde glue 1206-Akzo Nobel) is again applied with a roller. A cream-coloured printing base paper of a weight in relation to surface area of 60 g per square meter is applied by the roller to the glue layer while still wet and pressed in a calender at 160 kN/cm² and at a roller temperature of 190° C., the glue being at least partially hardened. In that case the outside surface of the paper remains unchanged, that is to say no glue penetrates through. Thereafter the paper is cut in the gap between the panels. The panels are immediately conveyed to a printing station in which a first colour of the decoration is applied by means of indirect intaglio printing. In a further printing station the second and third colours are applied, in which case brief airing between the stations is sufficient to dry the printing ink. Now a thin layer of a melamine formaldehyde resin (MFR, about 10 g/m$^2$) is applied and dried with an IR radiating device until the surface is bone-dry. In that condition the panels can be stacked or stored.

Further processing of the decorated panels is effected either directly after the printing operation (without application of the thin MFR layer) or after application of that layer and storage. Now a layer of a melamine resin in water which contains particles of aluminium oxide (corundum) of a mean size of 180-220 μm is applied to the decoration on the top side of the panel or the thin MFR layer by means of an application roller (for the purposes of low wear of ceramic). The viscosity of the resin solution is 120 mPas with a solid content of 60 percent by weight. The application weight of the resin solution is about 50 g/m$^2$ while that of the corundum is 15-20 g/m$^2$. The resin application is not sufficient to completely cover the corundum particles. The resin application weight corresponds to a layer thickness of about 40 μm (density 1.25 g/cm$^3$). The resin application is dried by means of an IR radiating device until its surface is bone dry and has sufficient adhesion to the decoration. In that case a flow of air is passed over the surface of the resin layer. At the same time as the application of resin to the top side an identical application but without corundum is applied to the underside of the panel as a stabilising layer and is subjected to initial drying. In the conveying operation the panel rests on a suitable conveyor means, for example a so-called disc transport means which is known from the painting and lacquering art and which bears the panel in point relationship and thus permits drying of the underside of the panel. After the initial drying operation the panel lies in the edge region on narrow rollers.

After the drying step a further layer of about 50 g/m$^2$ of the aqueous melamine resin is applied to the decoration side and to the underside and once again dried. That operation is repeated up to three times. As a result the resin layer is now of a thickness of up to 250 μm and completely covers the corundum particles.

The panel now coated with the useful layer and the stabilising layer is placed in an SC press and pressed for about 8-15 s at a temperature of the pressing plates of about 200° C. (corresponding approximately to 160° C. at the product) and under a pressure of 35-60 kN/cm$^2$. In that case the surface relief corresponding to the decor is embossed (Synchronpore).

The invention claimed is:

1. A process for producing a decorated laminate comprising a plate-shaped core of wood or wood material, a decorative layer on at least one side of the core and a cover layer having aminoplast on the decorative layer, comprising the steps:
    providing the plate-shaped core;
    applying a glue hardener onto at least one side of the core;
    fixing a cellulose nonwoven material with glue onto the at least one side of the core having the glue hardener;
    printing a decoration onto an exposed side of the cellulose nonwoven material;
    applying at least one hardenable cover layer to the printed decoration; and
    hardening the at least one hardenable cover layer by application of pressure and heat, wherein
    the flow and wetting properties and the application weight of the glue are matched to the properties of the cellulose nonwoven material to thereby avoid glue passing through the nonwoven material to the exposed surface.

2. The process according to claim 1, wherein the glue is a liquid hardening glue.

3. The process according to claim 2, wherein the glue is a urea formaldehyde glue.

4. The process according to claim 1, wherein the cellulose nonwoven material is a paper.

5. The process according to claim 4, wherein the paper is a printing base paper.

6. The process according to claim 5, wherein the printing base paper has a weight in relation to surface area of between 20 and 200 g per square meter.

7. The process according to claim 1, wherein the decoration is applied by printing by offset printing, indirect intaglio printing, flexoprinting or a digital printing process.

8. The process according to claim 1, wherein the decoration is printed in one color.

9. The process according to claim 1, wherein the decoration is printed in a plurality of colors.

10. The process according to claim 1, wherein the at least one hardenable cover layer comprises an aminoplast.

11. The process according to claim 10, wherein the aminoplast is a melamine formaldehyde resin.

12. The process according to claim 10, wherein there is a particulate hard solid material in the at least one hardenable cover layer.

13. The process according to claim 12, wherein the solid material is aluminum oxide, silicon dioxide, silicon carbide or boron nitride.

14. The process according to claim 1, wherein the at least one hardenable cover layer is applied in the form of an overlay.

15. The process according to claim 1, wherein a plurality of cover layers is applied.

16. The process according to claim 15, wherein each of the plurality of cover layers is surface-dried after the application operation.

17. The process according to claim 15, wherein a hard solid material is applied with a lowermost layer of the plurality of cover layers and an uppermost layer of the plurality of cover layers contains no solid material.

18. The process according to claim 1, wherein the laminate is heated and pressed in a double-belt or short-cycle press.

19. The process according to claim 1, wherein by the application of pressure and heat in the hardening step, a structure is embossed into the surface of an outermost cover layer.

20. The process according to claim 19, wherein the structure is in relation to the decoration.

21. The process according to claim 1, wherein a stabilizing layer is applied on the side of the core that is remote from the decoration.

22. The process according to claim 21, wherein the stabilizing layer is applied simultaneously with the decoration layers.

23. The process of claim 1, wherein the fixing step comprises:
    applying a glue on the applied glue hardener; and
    applying the cellulose nonwoven material on the glue; and
    the process further comprises the step of:
    partially drying the glue hardener after applying the glue hardener on the at least one side of the core and before applying the glue on the glue hardener.

24. The process of claim 1, wherein the fixing step comprises:
    applying a glue on one side of the cellulose nonwoven material; and
    applying the cellulose nonwoven material with the glue on one side to the applied glue hardener; and
    the process further comprising the step of:
    partially drying the glue hardener after applying the glue hardener on the at least one side of the core and before applying the cellulose nonwoven material with the glue on one side.

25. The process of claim 1, wherein the glue is at least partially hardened prior to printing a decoration onto an exposed side of the cellulose nonwoven material.

\* \* \* \* \*